May 5, 1970  KAZUYOSHI YAMADA ET AL  3,509,843

METHOD OF JOINING FLOATING HULL STRUCTURES

Original Filed April 4, 1968  4 Sheets-Sheet 1

INVENTOR.
KAZUYOSHI YAMADA & JURO DOI
BY McGlew & Toren
Attorneys

FIG. 17
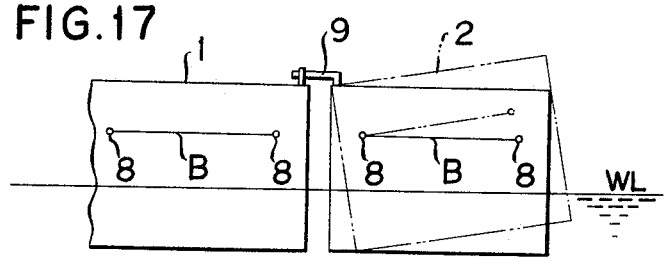
FIG. 18
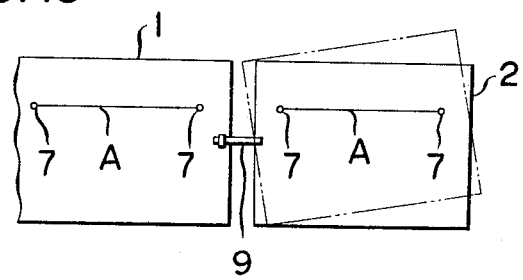
FIG. 19a
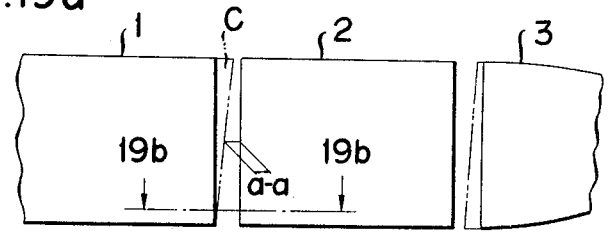
FIG. 19b
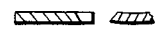
FIG. 20a
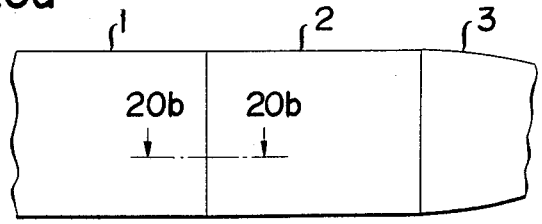
FIG. 20b United States Patent Office 3,509,843
Patented May 5, 1970

3,509,843
METHOD OF JOINING FLOATING HULL STRUCTURES
Kazuyoshi Yamada and Juro Doi, Tokohama-shi, Japan, assignors to Mitsubishi Jukogyo Kabushiki Kaisha, Chiyoda-ku, Tokyo, Japan
Original application Apr. 4, 1968, Ser. No. 718,661. Divided and this application Dec. 11, 1968, Ser. No. 798,535
Claims priority, application Japan, Apr. 28, 1967, 42/27,262
Int. Cl. B63b 3/02
U.S. Cl. 114—77                           1 Claim

---

ABSTRACT OF THE DISCLOSURE

A plurality of hull parts of a structure floating on the water such as the hull of a ship are joined together when the parts are floated in the water by initially interconnecting the parts with the use of interfitting elements which permits transverse and vertical movement between the two parts but fixes the longitudinal positions. The hull parts are subjected to ballasting and alignment after the initial fittings have been effected in order to provide accurate final alignment of the two hull parts and thereafter the two hull parts are drawn together and then joined together by welding.

---

This is a division of application Ser. No. 718,661, filed Apr. 4, 1968.

SUMMARY OF THE INVENTION

This invention relates in general to a method and apparatus for joining hull structures together, and in particular, to a new and useful method and apparatus for joining individual hull structures together after they have been floated on the water.

In recent times there is an increasing demand for ships of very large size. Existing building berths and docks are not suitable for the very large capacity ships which are being constructed. In order to make use of the docks which are available, ships are being constructed by separately making individual hull parts and thereafter joining these parts together. For example, a so-called divisional building process or a so-called tonnage increase building process has been carried out. In the case of the former, a plurality of divided parts of the hull of the ship are separately built and launched and are then joined together on the water. With the tonnage increase building process a new part of a hull is separately built and inserted between parts of a formerly constructed ship hull which are cut apart so that the new part may be added between the two cut-away parts. The new part is joined to the two previously constructed parts by welding it when all of the parts are arranged floating in the water.

Generally speaking, when an increase in length in the hull of an existing ship is to be obtained by cutting it in half and then inserting a new part between two parts, the vertical cutting is difficult. In addition, a joining surface of shell plating of the hull is not always vertical, and therefore, it is technically difficult to obtain a uniform gap for the butt-welding along an edge of the joining surface of each hull part.

In accordance with the present invention there are provided a new apparatus and method for aligning ship hull parts in the water and for thereafter joining them together. In accordance with the method of the invention, a plurality of hull parts are aligned without difficulty while the structures are floating on the water, and thereafter they are butt-welded together. The two hull structures which are to be joined together are properly spaced apart and are interconnected by means of connecting members in such a way that their relative motions in a longitudinal direction are controlled. The hull parts are permitted to move in transverse and vertical directions and may be subjected to heel and trim adjustments by ballasting.

One of the hull parts, preferably the new hull part, is finished along its joining edge and is provided with a grooved portion which may be interfitted with one of the parts of the previously constructed hull. After the two hull parts are aligned, the old hull part is finished by cutting in order to form the edges in a uniform spaced relationship to a new hull part. In addition, each hull part is finished to have a grooved portion.

Thereafter, the two hull parts are drawn together to a predetermined distance and are joined together by butt-welding.

For carrying out the method, the hull parts are initially provided with fittings which include a male portion on one part which interengages in a female portion of the other part and permits any necessary transverse and vertical relative movements but limits the longitudinal movements between the two parts. The relative position of the two parts to be joined are checked by alignment devices on both the deck and the sides of the vessel. Wedge members or fillers are arranged to position the two hull parts in an initial position and thereafter for finalizing the position. After the two hull parts are positioned in an initial interconnected position at which movement in the vertical and transverse directions of the two parts is possible, it is a simple matter to check the alignment of each part and make the necessary adjustments such as by ballasting and/or hoisting chains for pulling the parts into proper alignment. After proper alignment is affected, the parts may be moved together and butt-welding may be carried out to interconnect the parts along the entire connecting area.

Accordingly, it is an object of the present invention to provide an improved method of joining hull structures together when each structure is floating on the water comprising interconnecting the parts to be joined in a manner such that they are arranged in spaced aligned relationship so that they may be shifted transversely or vertically but to obtain proper alignment of the parts so that thereafter they may be shifted longitudinally into abutting relationship and welded together.

A further object of the invention is to provide apparatus for joining two hull structures together in the water which includes a plurality of different fittings including a male part contained on one of the hull parts to be joined together and a female part on the other hull part which are interengaged in a manner so that transverse and vertical movement of the two parts may be carried out but that the longitudinal movement will be controlled such as by the use of elements such as wedge members of selected thickness.

A further object of the invention is to provide a method of connecting together two hull parts or structures when the structures are floating in the water, comprising aligning the two parts and spacing them apart by a precise distance which is controlled by wedge elements of varying size, using sighting elements along the side of the ship to obtain the proper heel of the parts such as through ballasting or mechanically shifting the two parts, inserting a liner between supporting pieces which extend outwardly from each structure toward the opposite structure to obtain a proper distance between such structures and thereafter attaching strongbacks between the two structures to anchor them in the adjusted position, applying a watertight band around the vessel below the water line, pumping the space in the hull structures defined between the watertight bulkheads of each structure clear of water while ballasting the remaining hull structures as necessary to prevent strain, cutting one of the parts in order to provide a proper planar fitting of the two parts, shifting the two parts longitudinally into abutting relationship, and welding the two parts together.

A further object of the invention is to provide an apparatus for joining the two hull structures together in the water which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

In the drawings:

FIGS. 17 and 18 are side and plan views, respectively, showing both hull parts joined to each other by means of fitting units on the decks and sides;

FIG. 19a is a partial side elevatioanl view indicating the manner in which the old part is cut away prior to final alignment and welding together of the parts;

FIG. 19b is a section taken on the line 19b—19b of FIG. 19a;

FIG. 20a indicates the parts in proper adjoined alignment; and

FIG. 20b is a section taken on the line 20b—20b of FIG. 20a.

DETAILED DESCRIPTION OF THE PREFERRED EMBODIMENT

Figure 1:
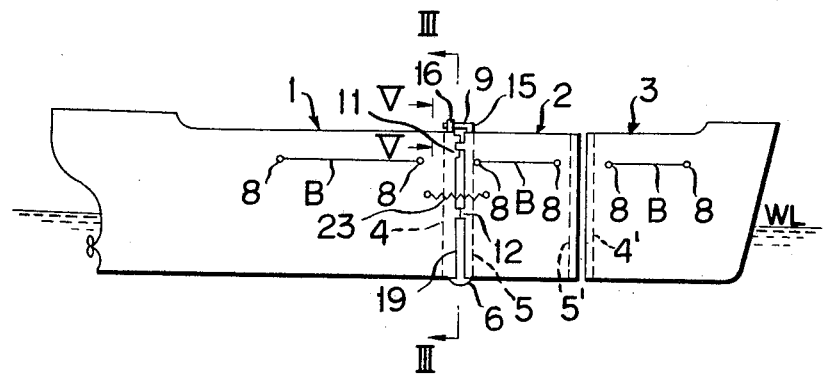
FIG. 1 is a schematic side elevational view of a hull of a ship on which the method of the present invention is carried out.

Referring to the drawings in particular, the invention embodied therein comprises a method and apparatus for joining together individual watertight structural hull parts such as the hull of a ship, which, in the embodiment illustrated, includes a rear part generally designated 1, an intermediate or new part generally designated 2, and a bore part generally designated 3. Each of the parts 1, 2 and 3 includes joining edges or ends extending outwardly from watertight bulkhead structures 4 and 5, 5' and 4', respectively. The cut end surfaces of the hull parts 1 and 3 are not finished but the end surfaces of the hull part 2 have a grooved portion along an edge to facilitate the joining operation. In general a groove on the deck of the part 2 is outwardly opened. The grooves on the sides and the bottoms are inwardly opened.

Figure 2:
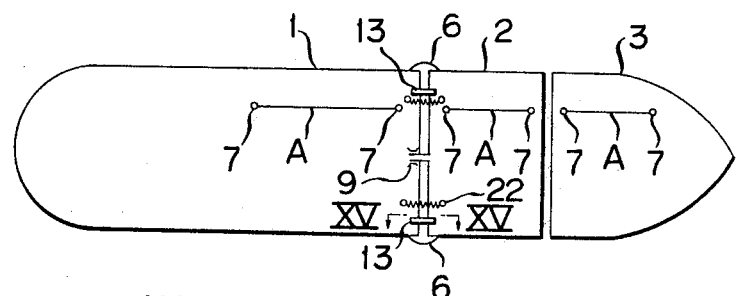
FIG. 2 is a top plan view of the ship hull shown in FIG. 1.

As indicated in FIGS. 1 and 2, a waterproof band apparatus for covering the shell plating along a welding line which extends below the water line is indicated at 6. Apparatus for sighting center lines on the deck are indicated by the line 7–7(A) on each of the parts 1, 2 and 3. Apparatus for sighting level lines on the side are indicated by the line 8–8(B) on each of the hull parts 1, 2 and 3. The sighting lines 7—7 and 8—8 may be provided on either side of the ship or on both sides, if desired.

In accordance with a feature of the invention, fitting units generally designated 9, 10, 11, 12, and 13, respectively, are provided for various stages of interfitting of the two hull parts. The fitting unit 9 is constructed to interconnect the two hull parts, for example the hull rear part 1 and the intermediate or new part 2, and maintain them in fixed spaced relationship so that proper vertical and transverse alignment thereof can be carried out. The fitting unit 9 includes a fitting rod or male part 15 carried on the new part 2 which engages into a receiving member or female part 16 on rear part 1 (see FIGS. 1, 2, 3, 5, and 6). The fitting unit 9 which is located on the top decks is constructed to permit only a controlled relative longitudinal motion between the parts 1 and 2 but transverse and vertical motions are permitted to effect final adjustment and alignment of the parts before they are brought together for welding. Wedge members 14 and 14' of different lengths are provided for locking between projections on the member 15 and the sides of the member 14 in order to position the hull parts 1 and 2 at the proper spacing for the initial alignment of the two parts.

Figure 3:
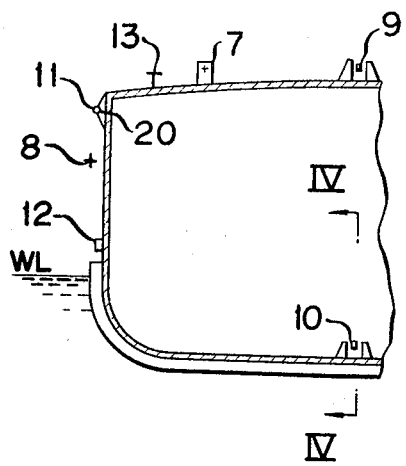
FIG. 3 is a partial sectional view taken along the lines III—III of FIG. 1.
Figure 4:
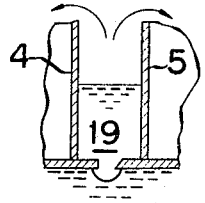
FIG. 4 is a partial sectional view taken along the line IV—IV of FIG. 3.
Figure 11:
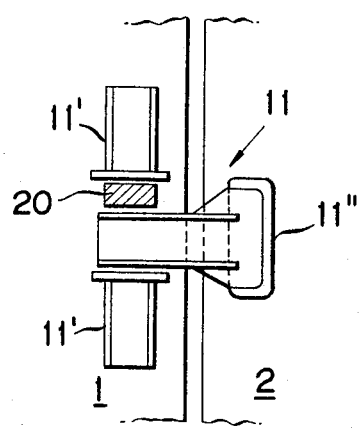
FIG. 11 is an enlarged partial side elevational view of the upper side fitting indicated in FIG. 1.
Figure 12:
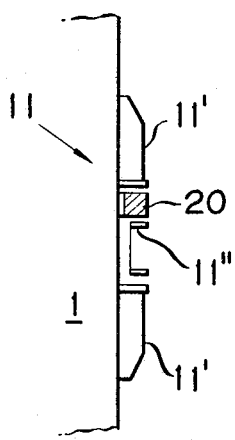
FIG. 12 is a section taken along line XII—XII of FIG. 11.
Figure 9:
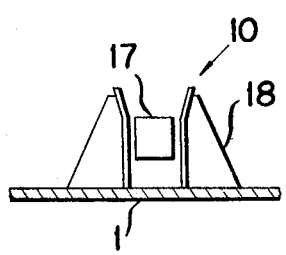
FIG. 9 is a partial sectional and partial front elevational view of the fitting part indicated at the central bottom of FIG. 3.
Figure 10:
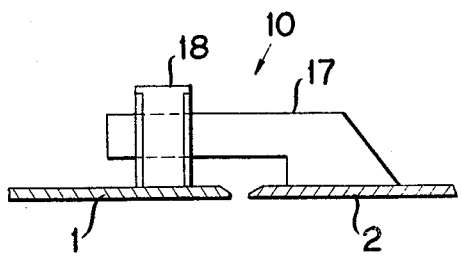
FIG. 10 is a partial section and partial side elevation of the fitting part indicated in FIG. 9 taken along the lines X—X of FIG. 9.

An additional fitting unit for aligning the hull parts 1 and 2 is the bottom fitting or unit 10 which is arranged adjacent the hull bottom or keel, as shown in FIG. 3 and in FIGS. 9 and 10. The fitting 10 comprises a male part 17 which engages in a receiving part or female part 18. The female part opens at its top and the male part 17 is fitted from above and may be moved vertically within the limits of the recess defined by the female part 18. This construction is designed to permit some transverse and some longitudinal movement of the two parts after they are interconnected.

A further fitting indicated 11 is provided for adjusting the level of the deck of each hull part and it is located on each side of the ship as shown in FIGS. 1, 3, 11 and 12. The fitting 11 includes a receiving member 11' carried on the hull part 1 and a male member 11" carried on the hull part 2. The receiving member 11' defines a recess which is large enough to accommodate the male part 11" and an adjustment member or liner 20. Depending on the size of the liner 20 which is employed and on its location, that is, either at the top or at the bottom of the male member 11", level adjustments can be made.

Figure 13:
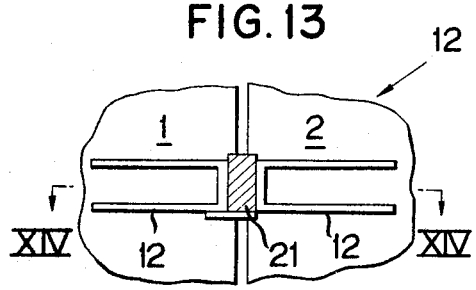
FIG. 13 is an enlarged side elevational view of the supporting piece provided at the water line of FIG. 1.
Figure 14:
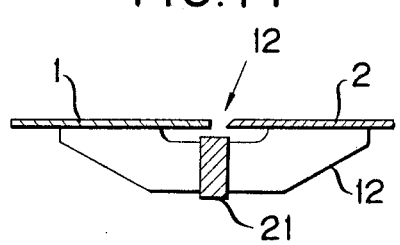
FIG. 14 is a section taken along the lines XIV—XIV of FIG. 13.
Figure 15:
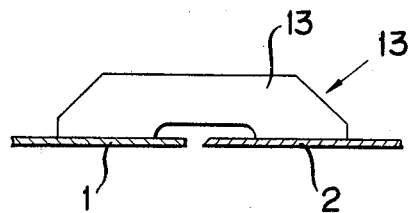
FIG. 15 is an enlarged partial sectional view taken along the line XV—XV of FIG. 2.
Figure 16:
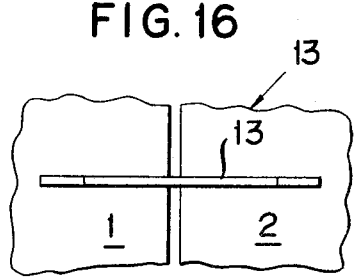
FIG. 16 is a plan view of the part indicated in FIG. 15.

A further fitting 12 for keeping the hull parts 1 and 2 at a predetermined distance is provided on the shell plating and longitudinal bulkheads of the hull parts adjacent the water line (FIG. 1). As indicated in FIGS. 13 and 14, the fitting 12 is designed to resist a pressing force due to water pressure produced when sea water is discharged from a cofferdam 19 formed interiorly of the bulkheads 4 and 5 of the respective parts 1 and 2. A liner 21 of a selected size is inserted into a gap between supporting pieces 12 after the alignment. The supporting piece 12 is designed to resist a pressing force due to water pressure which is reduced when sea water is discharged from the cofferdam 19.

A strongback generally designated 13 which extends over the top decks of the associated hull parts 1 and 2 is used together with the supporting piece 12 to keep the distance between the hull parts.

An apparatus for drawing together the hull parts 1 and 2 is indicated generally at 22, and is, for example, a chain block. The chain blocks are provided not only on the decks of the hull parts but also on the sides thereof, the side chain block being indicated by the numeral 23.

An example of the manner in which the method of the present invention is carried out when the hull part 1 is joined with the hull part 2 is as follows (the same method applies to the joining of the hull part 2 with the hull part 3 in a so-called divisional building method for two divided hull parts):

(1) Preliminary joining

Figure 5:
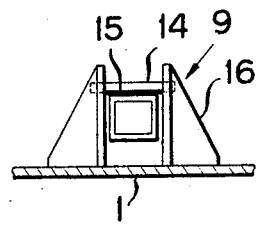
FIG. 5 is a partial sectional view taken along the lines V—V of FIG. 1.
Figure 6:
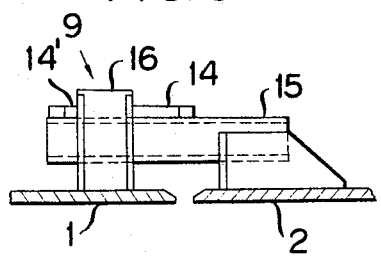
FIG. 6 is a partial side elevational and sectional view taken along the line VI—VI of FIG. 5.
Figure 7:
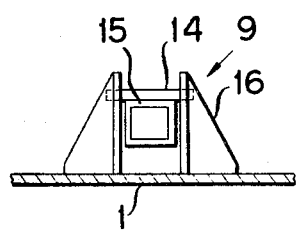
FIG. 7 is a view similar to FIG. 5, but with the parts in a joined position.
Figure 8:
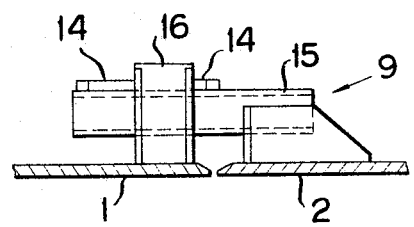
FIG. 8 is a view similar to FIG. 6, but with the parts in a joined position.

After the drafts of the hull parts 1 and 2 under water have been adjusted to be approximately equal to each other, the hull parts are drawn to each other by means of the chain blocks 22 and 23. The fitting units 9 and 10 are then in the fitted condition so that the center lines on the decks of the hull parts may be aligned. In addition, a distance a—a on the center lines between the hull parts is adjusted and is maintained constant by inserting wedges 14, as indicated in FIGS. 5 and 6, and in FIG. 19a. The distance a—a is preferably fixed at about 50 mm.

Heel adjustments are performed and correction is further made using the liner 20 of the fitting 11. In this manner, the levels of the decks and the sides of the hull parts 1 and 2 are set.

The sighting lines A on the decks of the hull parts 1 and 2 are aligned by means of the sighting apparatus 7—7 by moving the hull part 2 in a transverse direction with the help of chain blocks or the like (FIG. 2).

Basic lines B on the sides of the ship hull parts 1 and 2 are aligned by means of the sighting apparatus 8—8 or by water leveling devices (not shown) and by moving the hull part 2 in a vertical direction. In this manner, the alignment work using the fitting part 9 as a center is completed. When the aligned condition is achieved, the liner 21 is inserted into the gap between the supporting pieces 12 after the alignment, so that the distance at the water line between the hull parts is maintained. At the same time, the strongbacks 13 are joined with the decks by welding so that the relative orientation between both decks of the hull parts may be maintained.

The waterproof band 6 is then secured to the underwater shell plating along a joining area by divers. After a watertight relationship has been obtained between the joining portions 1 and 2 using a waterproof band, sea water is pumped out of the cofferdam 19 and the interior of the waterproof band 6 using pumps (not shown). During this operation, caution is exercised to see that the engaging points of the hull parts are not subjected to any excessive bending moments or shearing force. For this purpose, sea water may be shifted in the ballast tanks in order to adjust the orientation of the parts as necessary. In order to prevent the hull parts 1 and 2 from being pressed towards each other during the discharge of the sea water from the cofferdam 19, the supporting piece 12 and the strongbacks 13 are provided. The former will be under compression while the latter will be under tension.

A cutting line C is then formed on the part 1 which will be parallel to the end of the hull part 2 which has already been finished and includes a groove along its edge, as indicated in FIG. 19b.

A predetermined groove is formed by gas cutting along the line C. Thereby, the desired relative positions of the grooved ends of the hull part are obtained. After these relative positions of the underwater hull parts have been checked by measurements, fine adjustments of the connecting members, if necessary, are made before the proper joining is to be performed.

The cofferdam 19 is again filled with sea water while the waterproof band is loosened. Both the supporting piece 12 and the strongbacks 13 are removed.

(2) Final joining

The hull parts 1 and 2 are further drawn towards each other and set to have a determined distance by means of the fitting pieces 9, 10, and 11.

The waterproof band 6 is again tightened and the sea water contained in the cofferdam 19 is discharged. The strongbacks for welding are secured and the proper joining is performed by welding inside the hull.

After the hull parts 1 and 2 have been joined together by welding, the waterproof band 6 is removed and with this the joining work is completed.

In the joining work the metal fitting 11 and the fitting 12 may be provided either outside or inside the shell plating of the hull. Generally metal-fitting pieces for joining the parts together are employed, but various modifications of such pieces may be possible without departing from the principles of the invention.

The inventive method may be easily and simply carried out. It is preferable that one of the hull parts to be joined together is first formed with a joining edge which terminates in a predetermined planar manner and is advantageously provided with a grooved finish. The other part is then oriented with its rough cut edge in relation to the finished edge of the first part and while the longitudinal movements of the two parts are controlled, transverse and vertical movements are made to orient the parts in the correct positions relative to each other. Further alignments of the hull parts are made by ballasting and then a groove is prepared on the rough finished part which will be satisfactory for joining to the finished part and the hull parts are drawn together and welded.

The alignments of the hull parts can be easily made using as a reference point one or more points on the center line of the deck. More accurate marking of the cutting line is not needed, because an end of one hull part has already been finished, while that of the other hull part may be finished on the basis of the finished end of the first part. In the case of a divisional building method, alignment of the hull parts are carried out under water in which corrections of the positions of the two hull parts can be easily made.

While a specific embodiment of the invention has been shown and described in detail to illustrate the application of the inventive principles, it will be understood that the invention may be embodied otherwise without departing from such principles.

What is claimed is:

1. Apparatus for joining together a plurality of hull parts of a structure when the hull parts are floating on the water such as for joining the hull parts of a ship, comprising at least one fitting including a male member on one of the hull parts to be joined and a femal member on the other of the hull parts to be joined, said male member extending from the one hull part into the female member of the other part, wedge means for limiting longitudinal movement of said male member in said female member, hull parts to be joined together having a top deck structure on each part, said male member extending outwardly from the top deck of one part to engage a female member located on the top deck of the adjacent part, each of said hull parts including a watertight bulkhead and an edge to be joined which extends outwardly from the watertight bulkhead, one of said hull parts having a finished edge, at least one fitting being carried on said top deck of said two hull parts, a second fitting being carried on the side of said two hull parts, and a third fitting carried on the bottom of said two hull parts, and chain hoist means carried between said two hull parts for shifting said hull parts to provide more precise alignment thereof.

References Cited

UNITED STATES PATENTS 2,728,319    12/1955    Engstrand    114—77 X
3,035,536    5/1962    Archer    114—235 X TRYGVE M. BLIX, Primary Examiner